United States Patent
Kurz

(10) Patent No.: US 10,883,885 B2
(45) Date of Patent: Jan. 5, 2021

(54) METHOD FOR CALIBRATING A TEMPERATURE MEASURING DEVICE OF A DENTAL OVEN AND CALIBRATION ELEMENT

(71) Applicant: DENTSPLY SIRONA inc., York, PA (US)

(72) Inventor: Christian Kurz, Riegelsberg (DE)

(73) Assignee: DENTSPLY SIRONA INC., York, PA (US)

( * ) Notice: Subject to any disclaimer, the term of this patent is extended or adjusted under 35 U.S.C. 154(b) by 236 days.

(21) Appl. No.: 16/093,675

(22) PCT Filed: Apr. 13, 2017

(86) PCT No.: PCT/EP2017/058906
§ 371 (c)(1),
(2) Date: Oct. 15, 2018

(87) PCT Pub. No.: WO2017/178579
PCT Pub. Date: Oct. 19, 2017

(65) Prior Publication Data
US 2019/0128751 A1 May 2, 2019

(30) Foreign Application Priority Data

Apr. 15, 2016 (DE) .......................... 10 2016 206 447

(51) Int. Cl.
*G01K 15/00* (2006.01)
*F27B 17/02* (2006.01)

(52) U.S. Cl.
CPC .......... *G01K 15/002* (2013.01); *F27B 17/025* (2013.01)

(58) Field of Classification Search
CPC ...... A61K 6/824; G01K 15/002; G01K 11/06; G01K 15/005; G01K 5/48; G01K 15/00;
(Continued)

(56) References Cited

U.S. PATENT DOCUMENTS 6,318,890 B1 * 11/2001 Hutter ............... G01N 25/4846
374/1
6,384,382 B2 * 5/2002 Rohner .................. A61C 13/20
219/390

(Continued)

FOREIGN PATENT DOCUMENTS

CA 2334575 A1 8/2001
EP 1452843 A1 * 9/2004 ............... G01K 5/00
(Continued)

OTHER PUBLICATIONS

International Search Report; PCT/EP2017/058906; Jun. 12, 2017 (completed); Jul. 4, 2017 (dated).
(Continued)

*Primary Examiner* — Gail Kaplan Verbitsky
(74) *Attorney, Agent, or Firm* — Dentsply Sirona Inc.

(57) ABSTRACT

The invention relates to a method for calibrating a temperature measuring device of a dental oven by means of at least one calibration element, which is heated in the dental oven during a heating time interval (dt), wherein the at least one calibration element has at least one measurement material having a reversible phase transition occurring at a first transition temperature (TC1), the phase transition causes an abrupt change of at least one first parameter (I) of the dental oven, the temperature in the furnace chamber is measured by means of the temperature measuring device as an actual temperature (T), and the parameter (I) is measured, at least one first abrupt change (dI1) of the first parameter (I) is identified, a deviation of the first actual temperature value (T1), which is measured by the temperature measuring device when the first abrupt change (dI1) of the first parameter (I) occurs, from the first transition temperature (TC1) is determined, and the actual temperature (T) of the tempera-
(Continued)

ture measuring device is corrected in accordance with the deviation.

11 Claims, 2 Drawing Sheets

(58) Field of Classification Search
CPC ...... G01K 15/007; G01K 13/00; G01K 7/346; Y10T 29/49567; A61C 13/20
USPC ........... 374/1, 160, 185, 44, 45, 16; 432/120
See application file for complete search history.

(56) References Cited

U.S. PATENT DOCUMENTS

| | | | |
|---|---|---|---|
| 6,769,803 B1 * | 8/2004 | Feichtinger | G01K 5/00 219/201 |
| 7,534,028 B2 * | 5/2009 | Jussel | G01K 15/002 374/1 |
| 9,091,601 B2 | 7/2015 | Schalles | |
| 9,814,550 B2 * | 11/2017 | Rauh | F27B 17/025 |
| 10,260,811 B2 * | 4/2019 | Rohner | A61C 13/20 |
| 10,643,826 B2 * | 5/2020 | Kim | C23C 16/46 |
| 2004/0247013 A1 * | 12/2004 | Clark | G01K 15/00 374/1 |
| 2005/0025212 A1 | 2/2005 | Carter | |
| 2009/0225806 A1 * | 9/2009 | Lorunser | F27B 17/025 373/134 |

FOREIGN PATENT DOCUMENTS

| | | |
|---|---|---|
| GB | 2114293 B | 11/1985 |
| JP | 01212334 A * | 8/1989 |

OTHER PUBLICATIONS

International Preliminary Report on Patentability (IPRP); PCT/EP2017/058906; Oct. 25, 2018 (dated).
Written Opinion of the International Searching Authority; PCT/EP2017/0589064;Jul. 2017 (dated) Jun. 12, 2017 completed).
Garcia F et al: "A magnetic phase transition temperature calibration device"; Journal of applied physics, US, Bd. 85 No. 8; Apr. 15, 1999; pp. 5154-5156.

* cited by examiner

METHOD FOR CALIBRATING A TEMPERATURE MEASURING DEVICE OF A DENTAL OVEN AND CALIBRATION ELEMENT

TECHNICAL FIELD

The invention relates to a method for calibrating a temperature measuring device of a dental oven by means of at least one calibration element, wherein the at least one calibration element is heated in the dental oven during a heating time interval from a starting temperature to an end temperature and the temperature in the dental oven is measured during the heating time interval by means of the temperature measuring device as the actual temperature.

BACKGROUND OF THE INVENTION

Inductive high-temperature furnaces have recently begun to be used for the sintering, glazing and drying of dental restorations. Compared to resistively heated furnaces, induction furnaces have advantages with respect to speed.

Exact regulation of the temperature during the process is in particular important for glazing, because even small temperature deviations lead to poor crystallization results and potentially cause a reduction in strength or a fusing of the contours.

For the purpose of monitoring, the temperature is therefore measured during the process inside the oven by means of a temperature measuring device, e.g. a thermoelement. The temperature measuring device must be calibrated regularly, however, because deviations between the displayed temperature and the temperature actually prevailing in the oven, also referred to as drift, can occur as well, in particular as a result of aging processes.

For calibrating, a calibration element is typically arranged in a furnace chamber of the oven and heated. A sintered ring having a defined temperature-shrinkage ratio can be used, for example. Known also is the utilization of the defined melting point of a material, e.g. silver, by introducing a calibration element consisting of the material into the oven, heating the oven as precisely as possible to the melting temperature of the material and subsequently checking the state of the calibration element.

Another known variant is the utilization of the specific properties of aluminum, which retains its shape when the melting point is reached, but increases its volume by 7%. Calibration elements are available, for example, that have a contact bridge made of an aluminum wire, wherein the contact bridge is closed only once the melting point is reached due to the increase in the volume of the aluminum wire; as a result, the reaching of the melting temperature in the oven can be precisely identified.

The task of the invention is to further develop the prior art and to provide a reliable and cost-effective method for calibrating a temperature measuring device of a dental oven that is as accurate as possible, as well as a corresponding reliable and cost-effective calibration element.

SUMMARY OF THE INVENTION

One subject matter of the invention is a method for calibrating a temperature measuring device of a dental oven by means of at least one calibration element, wherein the at least one calibration element is heated in the dental oven during a heating time interval from a starting temperature to an end temperature and the temperature in the dental oven is measured during the heating time interval by means of the temperature measuring device as the actual temperature. The at least one calibration element has at least one measurement material having a reversible phase transition occurring at a first transition temperature, wherein the first transition temperature is higher than the starting temperature and lower than the end temperature and the phase transition causes an abrupt change of at least one first parameter of the dental oven. The first parameter of the dental oven is measured over the heating time interval and at least one first abrupt change in the first parameter is identified during the heating time interval, wherein a deviation of the first actual temperature value, which is measured by the temperature measuring device when the first abrupt change of the first parameter occurs, from the first transition temperature is determined, and the actual temperature of the temperature measuring device is corrected in accordance with the deviation.

Any material having a temperature-dependent reversible phase transition which affects a parameter of the dental oven is suitable for use as the measurement material. Phase transition refers to an abrupt change in a material property, for example an abrupt change in the permeability or the conductivity. Transition temperature refers to the material-specific temperature of the measurement material at which the phase transition, i.e. the change in the property, occurs.

The measurement material can be a ferromagnetic material, for example, which loses its ferromagnetic properties when a material-specific Curie temperature, the transition temperature, is reached. Above the Curie temperature, the material has a permeability of 0 or has only paramagnetic properties. This is a reversible phase transition of a ferromagnetic material into a paramagnetic high-temperature form or an abrupt change in material properties.

The phase transition of the calibration element located in the dental oven or the change in properties when the first transition temperature is reached leads to an abrupt change in a first parameter of the dental oven. By identifying the parameter or the abrupt change in the parameter, the temperature in the dental oven can thus be inferred. The more precisely the transition temperature of the calibration element is known, the more precisely the calibration can be performed. The transition temperature can, for example, be a fixed known property of the material. The specific transition temperature can furthermore be determined once with high precision for each individual calibration element; it can then be used for calibration with this calibration element, as a result of which the precision of the calibration is increased accordingly.

The parameter is a measurable variable of the dental oven which is affected by the phase transition of the measurement material, and can, for example, be a current, a voltage or a frequency. For example, the AC resistance of an inductor of an inductively operating dental oven can be used as a parameter, wherein, e.g. due to the disappearance of the permeability of a calibration element consisting of ferrite, an abrupt drop in the self-inductance of the inductor is caused, which leads to an abrupt reduction of the AC resistance.

The reduction of the AC resistance according to the above-described design example can, for example, be determined on the basis of the current flowing through the inductor or a current-time profile measured for the inductor, which decreases abruptly when the transition temperature in the dental oven is reached.

The size of the jump or the abrupt change is a function of the type and quantity of the measurement material of the calibration element. A cylindrical body consisting of ferrite and having a mass of 18.5 g, an external diameter of 16 mm, an internal diameter of 10 mm and a height of 28 mm in an induction furnace, for example, can produce a change in the current of approximately 2.5 A, whereas normally occurring fluctuations of the current typically amount to only approximately 0.5 A to 1 A; the change in the current caused by the phase transition of the calibration element can therefore be clearly distinguished from other fluctuations.

If the calibration element is not introduced into the dental oven until after the beginning of the heating time interval, the introduction can cause an abrupt change in the parameter as well. This can, however, be distinguished from the jump caused by the phase transition of the measurement material and to be identified for the calibration on the basis of the time and the algebraic sign. For example, the current-time profile of an induction furnace at the point in time when a ferromagnetic calibration element is introduced exhibits a jump caused by the permeability of the introduced calibration element.

The temperature in the combustion chamber is increased to at least an end temperature, which is higher than or equal to the transition temperature of the at least one measurement material. The actual temperature ascertained by the temperature measuring device is recorded at least in the regions of the phase transition.

If there is a deviation between an actual temperature displayed by the temperature measuring device at the point in time of the phase transition, i.e. the measured first actual temperature value, and the first transition temperature of the first measurement material of the calibration element, the temperature display of the temperature measuring device is corrected by the deviation. The deviation can, for example, be added as an offset to the actual temperature values of the temperature measuring device.

A number of parameters of the dental oven are already being measured to monitor the performance of the dental oven, so that no additional measuring device is needed and/or the existing measurement can be used to carry out the method according to the invention.

For example, the total current flowing in the heating circuit of an induction furnace is frequently monitored for the power calculation. To do this, a direct current, which is subsequently converted into an alternating current by means of an oscillator and fed to the inductor, is typically monitored directly at the power supply unit. Additional means to monitor the current for the calibration method are therefore not necessary. Any other variable related to the current can similarly be monitored to identify the abrupt change caused by the phase transition of the calibration element or the point in time of the phase transition. In order to be able to measure the first actual temperature value measured by the temperature measuring device at the phase transition, according to the invention it is merely necessary to somehow identify the phase transition.

Due to the reversibility of the phase transition of the measurement material, the method according to the invention can be carried out repeatedly with the same calibration element, or the calibration element can be used repeatedly.

In order to precisely hit the transition temperature of the phase transition during heating and to make a homogenization of the temperature in the oven during heating possible, it is advantageous to increase the temperature in the oven only slowly, in particular in a range around the transition temperature. In order to accelerate the calibration process, heating in temperature ranges further away from the transition temperature can also occur more quickly.

The more precisely the position of the calibration element in the oven corresponds to the position of a component to be sintered (e.g. with the use of a positioning template), the more exact the calibration to the actual sintering temperature of the oven can be.

One particular advantage of the method according to the invention is that it can run in a completely automated manner. The method can furthermore be carried out in a particularly simple and cost-effective manner, in particular by using a simple-to-produce calibration element that can be used and reused in a contact-free manner, and because devices for monitoring or measuring the first parameter of the dental oven are already in place and no additional devices are necessary.

The at least one calibration element advantageously comprises at least one first measurement material and one second measurement material, or at least one first calibration element comprising a first measurement material and one second calibration element comprising a second measurement material are heated in the dental oven at the same time. The first measurement material has a first transition temperature and the second measurement material has a second transition temperature, which differs from the first transition temperature. For each measurement material, an abrupt change in the first parameter during the heating time interval is identified and a deviation of the first actual temperature value, which is measured by the temperature measuring device when the first abrupt change of the first parameter occurs, from the first transition temperature of the respective measurement material is respectively determined. A correction value and/or a linear correction between the deviations is formed on the basis of the deviations identified for the different measurement materials, and the actual temperature of the temperature measuring device is corrected by the correction value and/or the linear correction.

The multipoint calibration using the different measurement materials increases the precision of the calibration process in a simple manner, without significantly increasing the time needed for the calibration process. The more measurement materials which differ with respect to the transition temperature the calibration element comprises, or the more calibration elements with respective measurement materials which differ with respect to the transition temperature, the more temperature deviations can be identified within the heating time interval and taken into account for the calibration of the temperature measuring device. In doing so, the material and production-related costs, in particular for a calibration element comprising a plurality of measurement materials, or the process-related costs when using a plurality of calibration elements, increase only slightly. The correction value can be an averaged correction value, for example, or a linear correction can be performed.

The calibration element is advantageously inductively heated by means of the dental oven. The materials affecting the induction properties of the dental oven can thus be used as the measurement materials, or an effect on the induction properties of the dental oven can be easily demonstrated, for example, on the basis of a change in the induction current or the voltage applied to the induction furnace.

At least one measurement material is advantageously ferromagnetic or ferrimagnetic, wherein the transition temperature corresponds to the Curie temperature of the measurement material. With a typical tolerance of approximately +/−5 Kelvin below 100° C. and +/−7.5 Kelvin above 100° C. for the Curie temperature of a ferromagnetic material, the Curie temperature is particularly well suited for a precise temperature determination or for a target calibration precision of e.g. +/−20 Kelvin. The specific Curie temperature can furthermore be determined once with higher precision for each calibration element; it can then be used for calibration with this calibration element, as a result of which the precision of the calibration is increased accordingly.

At least one measurement material advantageously exhibits an abrupt change in the conductivity as a function of the temperature. The conductivity also represents a material property, the abrupt change of which, for example, affects the self-inductance of an induction furnace.

The parameter is advantageously an amplitude of a current or a voltage or a frequency of an alternating current or an alternating voltage. These are easy-to-measure properties of the dental oven, which are also frequently measured to monitor the performance of the oven.

The invention further relates to a calibration element for calibrating a temperature measuring device of a dental oven, which comprises at least one first measurement material, wherein the measurement material has a reversible phase transition which occurs at a first transition temperature.

A phase transition of a measurement material, which causes an abrupt change in a material property, can affect a parameter of a dental oven. The disappearance of the permeability of a ferromagnetic material, for example, causes a load jump of an inductor used for heating when the material-specific Curie temperature is reached. Due to the reversibility and a critical temperature dependence of the phase transition, a calibration element consisting of a measurement material according to the invention is suitable for calibrating dental ovens. Since the calibration element does not have to satisfy any requirements other than comprising the at least one measurement material, the calibration element can be produced in a cost-effective and simple manner.

It goes without saying that the calibration element consists of a heat-resistant material that does not outgas during heating. In addition, all statements made in the explanation of the method according to the invention can be applied to the measurement material of the calibration element and the properties thereof.

The calibration element advantageously comprises at least two measurement materials, wherein the measurement materials respectively have different transition temperatures. Such a calibration element allows a multipoint calibration, as a result of which higher precision of the calibration can be achieved.

The at least two measurement materials are advantageously arranged one above the other in the form of a stack. It goes without saying that any desired arrangement of the two measurement materials is possible. A stack-type arrangement represents a particularly simple arrangement, which is in particular easy to produce. The stack-type arrangement merely refers to a layer-type structure and is not intended to restrict how said stack is arranged in a dental oven. A calibration element positioned in the dental oven and having measurement materials arranged next to one another in particular also represents a stack-type arrangement, wherein the calibration element is positioned lying on one side.

At least one measurement material is advantageously ferromagnetic or ferrimagnetic, wherein the transition temperature of the at least one measurement material corresponds to the Curie temperature, or the at least one measurement material exhibits an abrupt change in the conductivity when the transition temperature is reached.

BRIEF DESCRIPTION OF THE DRAWINGS

Design examples of the invention are shown in the drawing. The figures show

DETAILED DESCRIPTION OF THE INVENTION

Figure 1:
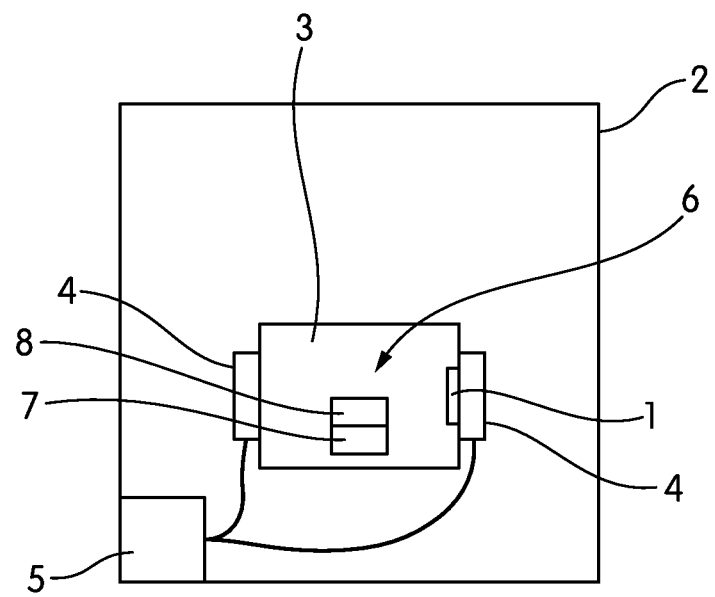
FIG. 1 a schematic view of a setup for calibrating a temperature measuring device of a dental oven according to the invention, FIG. 2 a sketch of a current-time profile and a temperature-time profile during a calibration according to the invention, FIG. 3 a schematic sequence of the calibration method according to the invention.

FIG. 1 shows a setup for calibrating a temperature measuring device 1 of a dental oven 2. The temperature measuring device 1 is at least partially disposed within a furnace chamber 3 of the dental oven 2. In order to heat the furnace chamber 3, the dental oven 2 in the illustrated design example comprises at least one inductor 4, which is operated by means of a current/voltage source 5.

For the calibration, a calibration element 6 is disposed in the furnace chamber 3 and heated by means of the inductor 4, wherein an actual temperature in the furnace chamber is measured by means of the temperature measuring device 1.

In the illustrated design example, the calibration element 6 comprises a first and a second measurement material 7, 8, wherein the two measurement materials 7, 8 are arranged one above the other in the form of a stack. The first measurement material 7 is ferromagnetic and has as its first transition temperature TC1 a Curie temperature at which the first measurement material 7 transitions into a paramagnetic high-temperature state. The second material 8 is likewise ferromagnetic and has as the second transition temperature TC2 a Curie temperature at which the second measurement material transitions into a paramagnetic high-temperature state, wherein the second transition temperature TC2 is higher than the first transition temperature TC1.

The phase transition of the measurement materials 7, 8 causes a respective load jump of the dental oven 2 which can, for example, be identified by looking at the current consumption. In the design example described here, the first parameter I, which is affected by the phase transition, is therefore the current flowing through the inductor.

Figure 2:
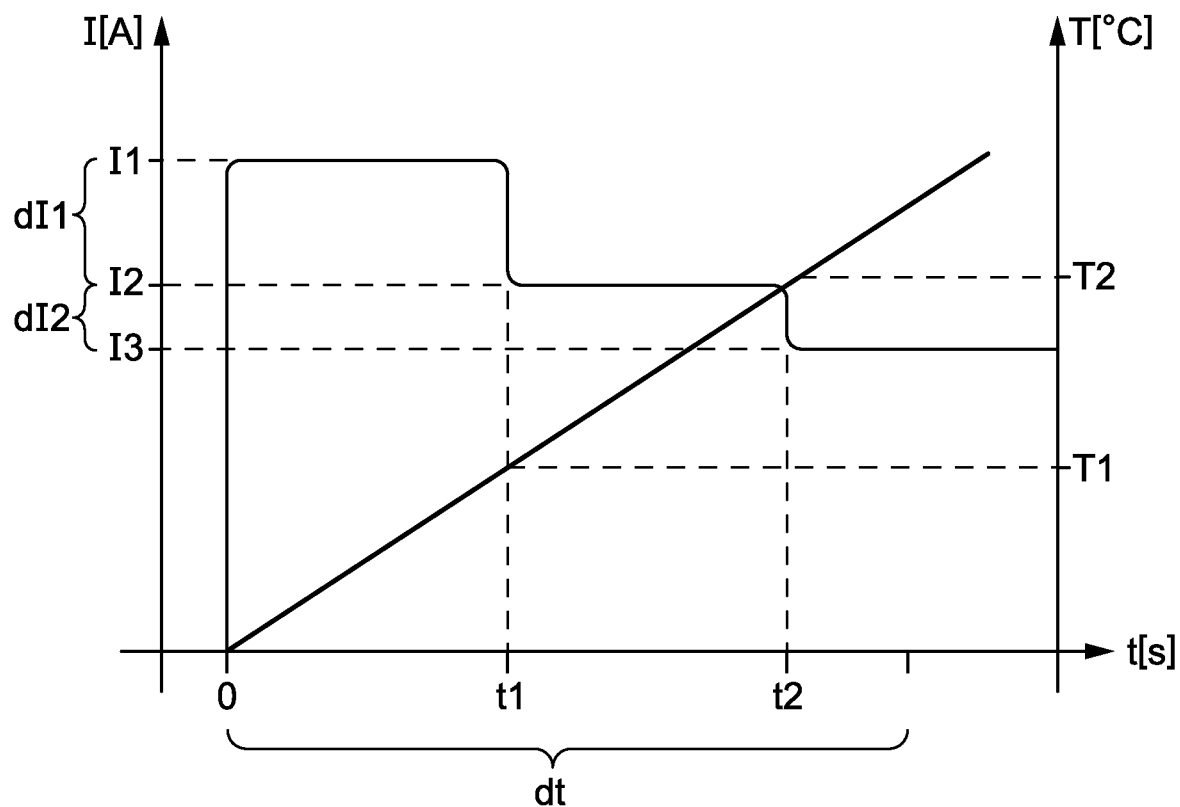

In a graph, FIG. 2 shows the progression curves of the current I flowing through the inductor 4 and the actual temperature T measured by the temperature measuring device 1 as a function of a time t during the heating of the calibration element 6 in the dental oven 2. After the current/voltage source 5 is switched on at a point in time t=0 and the current drop I at the inductor 4 jumps to a value I=I1, the actual temperature T in the illustrated design example increases linearly over the time t.

The current I has a relatively constant value I=I1 up to a point in time t=t1. At the point in time t=t1, the current consumption I in the illustrated design example decreases by dI1 to I2=I1−dI1. At the time t following the point in time t=t1, the current I stays at a value I=I2 up to a point in time t=t2, wherein t2 is greater than t1. At the point in time t=t2, the current I flowing through the inductor 4 falls by DI2 to I3=I2−dI2.

The first jump dI1 of the current profile I at the point in time t=t1 indicates the phase transition of the first ferromagnetic material 7 of the calibration element 6, and thus the reaching of the first transition temperature TC1 in the furnace chamber 3, while the second jump dI2 of the current profile I at the point in time t=t2 identifies the phase transition of the second ferromagnetic material 8, i.e. the reaching of the second transition temperature TC2 in the furnace chamber 3. Accordingly, the points in time t1 and t2 can easily be inferred from the current-time profile on the basis of the jumps. In the illustrated design example, the actual temperature measurement values t1 and t2 for the respective phase transitions measured by means of the temperature measuring device 1 can correspondingly be inferred from the temperature-time profile for the points in time t1 and t2.

Figure 3:
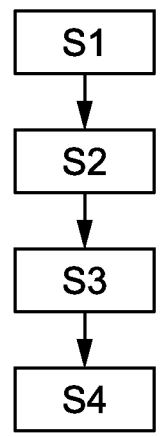

FIG. 3 schematically shows the method steps according to a first embodiment. After heating the calibration element 6 in a first step S1, the jumps in the current-time profile of the current I flowing through the inductor 4 or the points in time t1 and t2 corresponding to the jumps, the first actual temperature value T1 measured by the temperature measuring device 1 at the first point in time t1 and the second actual temperature value t2 measured by the temperature measuring device 1 at the second point in time t2 are identified in a second step S2.

In a third step S3, a first deviation A1 of the first actual temperature value T1 from the first transition temperature TC1 and a second deviation A2 of the second actual temperature value t2 from the second transition temperature TC2 are determined.

In a step S4, the actual temperature T of the temperature measuring device 1 is corrected using a correction value K formed with the aid of the two deviations A1, A2 and/or by means of a linear correction between the deviations A1 and A2 across the temperature range.

LIST OF REFERENCE SIGNS

1 Temperature measuring device
2 Dental oven
3 Furnace chamber
4 Inductor
5 Current/voltage source
6 Calibration element
7 First measurement material
8 Second measurement material
dI1, dI2 abrupt change of the parameter
dt Heating time interval
I parameter
S1-S4 Method steps
T Actual temperature
T1, T2 First and second actual temperature value
TC1, TC2 First and second transition temperature
t Time

The invention claimed is:

1. Method for calibrating a temperature measuring device of a dental oven by means of at least one calibration element, comprising the steps of:
   heating, during a heating time interval (dt), the at least one calibration element in the dental oven from a starting temperature (TA) to an end temperature (TE),
   measuring, during the heating time interval (dt), the temperature in the dental oven by means of the temperature measuring device as the actual temperature (T),
   wherein
      the at least one calibration element has at least one measurement material,
      the measurement material has a reversible phase transition occurring at a first transition temperature (TC1),
      the first transition temperature (TC1) is higher than the starting temperature (TA) and lower than the end temperature (TE),
      the phase transition causes an abrupt change in at least one first parameter (I) of the dental oven,
      the first parameter (I) of the dental oven is measured over the heating time interval (dt) and at least one first abrupt change (dI1) of the first parameter (I) is identified during the heating time interval (dt),
      wherein a deviation of the first actual temperature value (T1), which is measured by the temperature measuring device when the first abrupt change (dI1) of the first parameter (I) occurs, from the first transition temperature (TC1) is determined, and the actual temperature (T) of the temperature measuring device is corrected in accordance with the deviation.

2. Method according to claim 1, wherein the at least one calibration element comprises at least one first measurement material and a second measurement material or at least one first calibration element comprising first measurement material and a second calibration element comprising second measurement material are heated in the dental oven at the same time,
   wherein the first measurement material has a first transition temperature (TC1) and the second measurement material has a second transition temperature (TC2) which differs from the first transition temperature (TC1),
   wherein an abrupt change (dI1, dI2) of the first parameter (I) is identified during the heating time interval (dt) for each measurement material, a deviation of the actual temperature value (T1, T2) measured with the temperature measuring device at the respective abrupt change (dI1, dI2) of the first parameter (I) from the respective transition temperature (TC1, TC2) of the respective measurement material is respectively determined, and
   wherein a correction value (K) and/or a linear correction between the deviations is formed on the basis of the deviations identified for the different measurement materials, and the actual temperature (T) of the temperature measuring device is corrected by the correction value (K) and/or the linear correction.

3. Method according to claim 1, wherein the calibration element is inductively heated by means of the dental oven.

4. Method according to claim 1, wherein at least one measurement material is ferromagnetic or ferrimagnetic, wherein the transition temperature (TC1, TC2) corresponds to the Curie temperature of the measurement material.

5. Method according to claim 1, wherein at least one measurement material shows an abrupt change in conductivity as a function of the temperature.

6. Method according to claim 1, wherein the parameter (I) is an amplitude of a current or a voltage or a frequency of an alternating current or an alternating voltage.

7. Calibration element for calibrating a temperature measuring device of a dental oven, wherein the calibration element comprises at least one first measurement material, wherein the at least one measurement material has a reversible phase transition which occurs at a first transition temperature (TC1).

8. Calibration element according to claim 7, wherein the calibration element comprises at least two measurement materials, wherein the at least two measurement materials respectively have different transition temperatures (TC1, TC2).

9. Calibration element according to claim 8, wherein the at least two measurement materials are arranged one above the other in the form of a stack.

10. Calibration element according to claim 7, wherein at least one measurement material is ferromagnetic or ferrimagnetic and that the transition temperature (TC1, TC2) of the at least one measurement material (TC1, TC2) corresponds to the Curie temperature.

11. Calibration element according to claim 7, wherein at least one measurement material shows an abrupt change in conductivity when the transition temperature (TC1, TC2) is reached.

* * * * *